UNITED STATES PATENT OFFICE.

GEORGE R. HARRISON, OF HONOLULU, HAWAII, ASSIGNOR TO JAS. L. EWIN, OF WASHINGTON, DISTRICT OF COLUMBIA.

DEHYDRATING AND MOTHPROOFING COMPOSITION.

SPECIFICATION forming part of Letters Patent No. 653,674, dated July 17, 1900.

Application filed December 5, 1899. Serial No. 739,241. (No specimens.)

*To all whom it may concern:*

Be it known that I, GEORGE R. HARRISON, a citizen of the United States of America, and a resident of Honolulu, Hawaii, have invented a new and useful Improvement in Dehydrating and Mothproofing Compounds, of which the following is a specification.

This invention consists in a novel composition of matter primarily designed for the protection of pianos and like musical instruments from the deleterious effects of damp atmosphere and from the ravages of moths, and useful also with or without one of its ingredients for the protection of surgeons' instruments and other articles of iron or steel against rust.

The improved dehydrating and mothproofing compound is composed of the following ingredients in about the proportions, by weight, here specified, namely: pulverized calcium chloride, one pound; pulverized charcoal, one-half pound; pulverized sulphur, one-half pound; pulverized rosin, one-half pound; alcohol, a sufficient quantity. The solid ingredients are mixed into a thick paste with the alcohol.

The compound, while it is still soft, is packed in tin boxes, where it becomes moderately hard by the evaporation of so much of the alcohol as does not enter into chemical combination with the sulphur and rosin.

The alcohol, in addition to moistening the other ingredients, serves to dissolve the rosin to a sufficient extent to form therefrom a resinous coating of the particles to render the mass to some degree waterproof, while still absorbent to moisture, and thus to prolong its efficiency. The alcohol also acts on the sulphur and renders it to a sufficient extent volatile, the resultant fumes serving to repel moths and other insects.

The charcoal, and therewith the sulphur, serves to render the mass porous for the admission of the moisture to the calcium chloride, which is the active ingredient in absorbing any dampness from the atmosphere, and thus protecting exposed parts of iron or steel, glued joints, &c., that would otherwise be attacked by such moisture.

Willow charcoal is preferred; but its distinctive character is not considered essential, and the other ingredients may be of the usual commercial standards.

For use in surgeons' cabinets and in showcases and bay-windows, where cutlery and other articles of iron or steel are exposed, the quantity of charcoal may be doubled and the sulphur omitted without materially changing the character of the composition as a moisture-absorbent or dehydrating compound; and the proportions of the several ingredients above stated may be slightly varied without materially changing the product.

In use an uncovered box of the paste is exposed within the case of a piano or like instrument or within the surgeon's cabinet, show-case, or bay-window the contents of which are to be protected.

Having thus described said composition of matter, I claim as my invention and desire to patent under this specification—

1. A moisture-absorbing paste comprising calcium chloride, charcoal and rosin mixed with alcohol.

2. A dehydrating and mothproofing compound consisting of calcium chloride, charcoal, sulphur and rosin, mixed with alcohol, substantially as hereinbefore specified.

G. R. HARRISON.

Witnesses:
JAS. L. EWIN,
E. THOS. LOFTUS.